United States Patent
Piacentino et al.

(10) Patent No.: US 11,394,879 B2
(45) Date of Patent: Jul. 19, 2022

(54) METHODS FOR ENHANCED IMAGING BASED ON SEMANTIC PROCESSING AND DYNAMIC SCENE MODELING

(71) Applicant: SRI International, Menlo Park, CA (US)

(72) Inventors: Michael R. Piacentino, Robbinsville, NJ (US); John R. Tower, Yardley, PA (US); Michael A. Isnardi, Plainsboro, NJ (US); Sek M. Chai, Princeton, NJ (US)

(73) Assignee: SRI International, Menlo Park, CA (US)

( * ) Notice: Subject to any disclaimer, the term of this patent is extended or adjusted under 35 U.S.C. 154(b) by 0 days.

(21) Appl. No.: 17/044,245

(22) PCT Filed: Oct. 1, 2018

(86) PCT No.: PCT/US2018/053749
§ 371 (c)(1),
(2) Date: Sep. 30, 2020

(87) PCT Pub. No.: WO2019/194863
PCT Pub. Date: Oct. 10, 2019

(65) Prior Publication Data
US 2021/0160422 A1 May 27, 2021

Related U.S. Application Data

(60) Provisional application No. 62/652,891, filed on Apr. 4, 2018.

(51) Int. Cl.
*H04N 5/232* (2006.01)

(52) U.S. Cl.
CPC ..... *H04N 5/23222* (2013.01); *H04N 5/23218* (2018.08); *H04N 5/23241* (2013.01)

(58) Field of Classification Search
CPC .......... H04N 5/23222; H04N 5/23218; H04N 5/23241
See application file for complete search history.

(56) References Cited

U.S. PATENT DOCUMENTS

| 2010/0123137 A1 | 5/2010 | Guidash |
| 2015/0082331 A1 | 3/2015 | Neumeier et al. |
| 2016/0142613 A1* | 5/2016 | Brav ............. H04N 5/23238 348/211.3 |

OTHER PUBLICATIONS

International Search Report and Written Opinion, PCT/US2018/053749, ISA:US, dated Jan. 2, 2019, 12 pp.

* cited by examiner

*Primary Examiner* — Tat C Chio
(74) *Attorney, Agent, or Firm* — Rutan & Tucker, LLP

(57) ABSTRACT

Modules and control units cooperate to simultaneously and independently control and adjust pixel parameters non-uniformly at regional increments across an entire image captured in an image frame by pixels in a pixel array. Pixel parameter changes for pixels in a given region occur, based on i) a contextual understanding of what contextually was happening in the one or more prior image frames and ii) whether salient items are located within that region. Additionally, guidance is sent to the sensor control unit to i) increase or decrease pixel parameters within those regions with salient items and then either to i) maintain, ii) increase or iii) decrease pixel parameters within regions without salient items in order to stay within any i) bandwidth limitations ii) memory storage, and/or iii) power consumptions limitations imposed by 1) one or more image sensors or 2) the communication loop between the sensor control unit and the image processing unit.

22 Claims, 12 Drawing Sheets

```
                    ( Start )
                        │
                        ▼
```

The system tracks trends in previous image frames, referencing scene data models, and utilizing one or more artificial intelligence algorithms to understand what is contextually happening in the first image frame, and then changing the image pixel parameters to increase pixel parameters in the first window region while simultaneously maintaining or reducing image pixel parameters in the second window region based on i) the contextual understanding of what contextually was happening in the previous image frame and ii) whether salient items are predicted to be located within the first window region and not located in the second window region.

802

The system optimizes quality of image information with a sensor control unit to simultaneously independently control pixel parameters of i) local resolution, ii) dynamic range, and iii) frame rate within numerous regions of a [single/] first image frame based on i) a contextual understanding of at least what contextually was happening in a previous image frame and ii) whether salient items are located within any of a first window region of the first image frame and a second window region of the first image frame, where pixel parameters for pixels in the first window region are configured to be operating differently than the pixel parameters for pixel data being collected out of the second window region for that same first image frame.

804

The system adjusts output pixel data rates with the sensor control unit to increase pixel parameters of any of i) the local resolution, ii) the dynamic range, and iii) the frame rate for pixels in the first window region while simultaneously maintaining or reducing any of i) the local resolution, ii) the frame rate, and iii) the dynamic range in the second window region, which contains non-salient items contained in the first image frame.

The image information quality is optimized while staying within 1) any i) bandwidth limitations ii) memory storage, and/or iii) power consumptions limitations imposed by one or more image sensors with the pixels capturing the pixel data in window regions making up the first image frame, and 2) any i) bandwidth limitations ii) memory storage, and/or iii) power consumptions limitations imposed by a communication loop between the sensor control unit and the image sensors.
808

The image pixel data for the first window region is being collected from those pixels in a different collection cycle [at a different point in time] than the image pixel data from the pixels in the second window region for that same image frame.
810

The system uses the sensor control unit to apply higher performance pixel parameters to merely pixels collecting pixel data across one or more portions making up the entirety of the first image frame but not across the entire first image frame; and thus, some pixels making up the entire image frame are operating at lower performance pixel parameters simultaneously while the other pixels are performing at the higher performance pixel parameters based on i) the contextual understanding of at least what contextually was happening in the previous image frame and ii) whether salient items are located within any of the first window region of the first image frame, the second window region of the first image frame, or both the first and second window regions.
812

The system uses a separate controller to make global changes to pixel parameters for all of the pixels making up the entire first image frame based on at least environmental lighting conditions.
814

The system uses using a compositor module to collect all of the image pixel data from all of the window regions making up the first image frame, and then reassembling image pixel data, from at least the first window region and the second window region collected on different cycles, for the first image frame based on the frame indicator correlating to the first image frame.
816

(End)

Fig. 8B

METHODS FOR ENHANCED IMAGING BASED ON SEMANTIC PROCESSING AND DYNAMIC SCENE MODELING

CROSS-REFERENCE

This application is a 35 U.S.C. § 371 U.S. National Stage of International Patent Application No. PCT/US2018/053749, titled "METHODS FOR ENHANCED IMAGING BASED ON SEMANTIC PROCESSING AND DYNAMIC SCENE MODELING" having an International Filing Date of Oct. 1, 2018 which claims priority under 35 USC 119 to U.S. provisional patent application Ser. No. 62/652,891, titled "Methods for enhanced imaging based on semantic processing and dynamic scene modeling," filed: Apr. 4, 2018, which is incorporated herein by reference in its entirety.

CROSS-REFERENCE

This application claims priority under 35 USC 119 to U.S. provisional patent application Ser. No. 62/652,891, titled "Methods for enhanced imaging based on semantic processing and dynamic scene modeling," filed: Apr. 4, 2018, which is incorporated herein by reference in its entirety.

TECHNICAL FIELD

Embodiments of this disclosure relate generally to image sensing. More specifically, an embodiment relates to image sensing with one or more modules using artificial intelligence (AI).

BACKGROUND

Today to reach the required resolution, dynamic range and frame rate in local image regions, COTS cameras typically apply high performance parameters across the entire frame yielding very high unmanageable data rates and higher SWaP solutions.

SUMMARY

Provided herein can be various methods, apparatuses, and systems for imaging. In an embodiment, modules and control units cooperate to simultaneously and independently control and adjust pixel parameters non-uniformly at regional increments across an entire image captured in an image frame by pixels in a pixel array. Pixel parameter changes for pixels in a given region occur, based on i) any of a contextual understanding of at least what contextually was happening in a prior image frame, a contextual understanding of a scene, and a contextual understanding of an anticipated scene, and ii) whether salient items are located within that region. Additionally, guidance is sent to the sensor control unit to i) increase pixel parameters within those regions with salient items and then either to i) maintain or ii) decrease pixel parameters within regions without salient items in order to stay within any i) bandwidth limitations ii) memory storage, and/or iii) power consumptions limitations imposed by 1) one or more image sensors or 2) the communication loop between the sensor control unit and the image processing unit. The sensor control unit is able to adjust parameters in regions to account for that outcome.

DRAWINGS

FIGS. 8A and 8B illustrate a flow diagram of an embodiment of enhancing imaging based on semantic processing and dynamic scene modeling;

Figure 1:
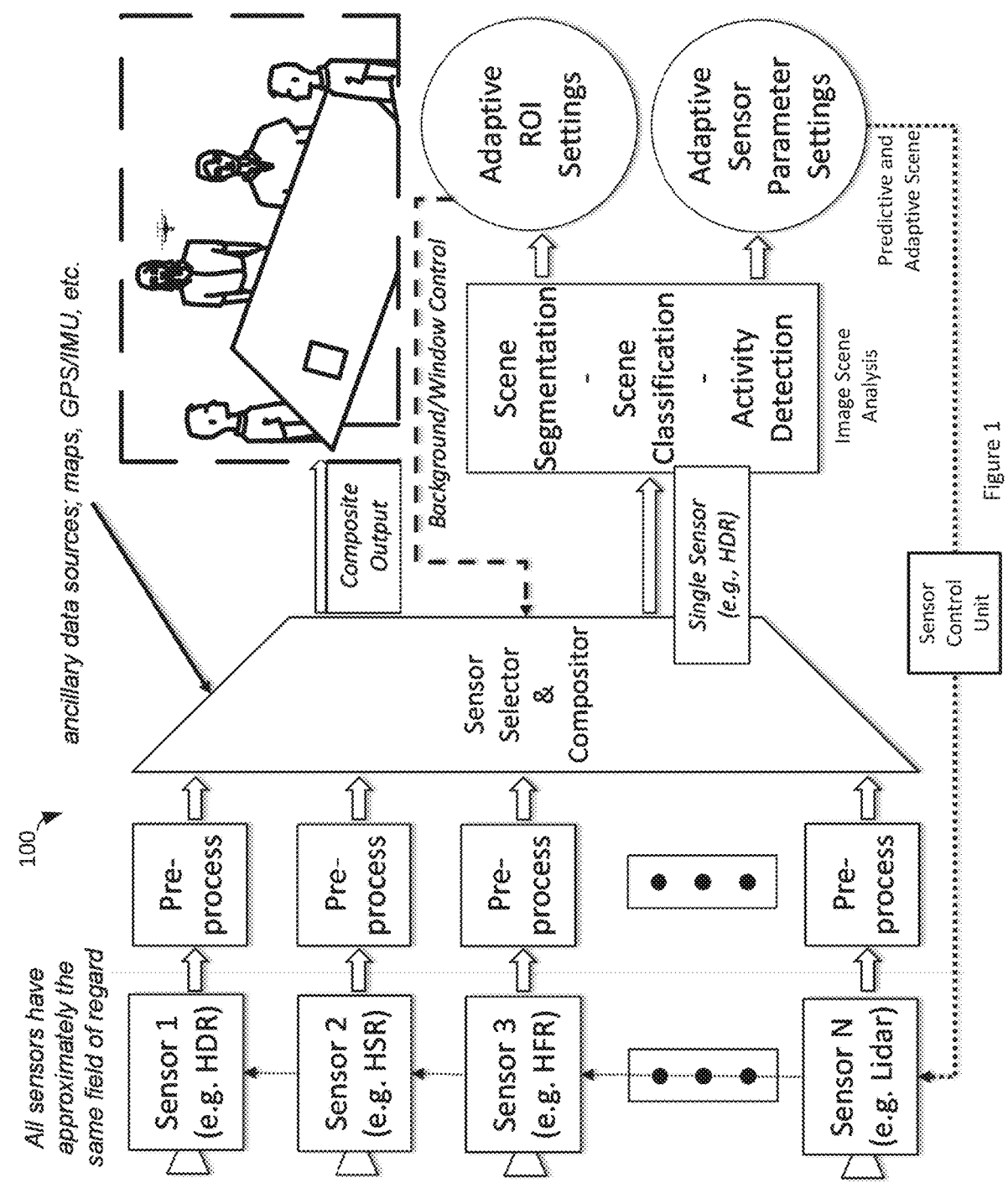
FIG. 1 illustrates a block diagram of an embodiment of a smart vision architecture for enhanced imaging based on semantic processing and dynamic scene modeling.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details can be set forth, such as examples of specific data signals, named components, number of frames, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as the first server, can be made. However, the specific numeric reference should not be interpreted as a literal sequential order but rather interpreted that the first server is different than a second server. Thus, the specific details set forth can be merely exemplary. The specific details can be varied from and still be contemplated to be within the spirit and scope of the present design. The term "coupled" is defined as meaning connected either directly to the component or indirectly to the component through another component.

FIG. 1 illustrates a block diagram of an embodiment of a smart vision architecture for enhanced imaging based on semantic processing and dynamic scene modeling.

The smart vision system 100 may use a distributed image sensor architecture. The smart vision system 100 may include, for example, multiple image sensors, such as sensor 1, sensor 2, sensor 3, through sensor N. Each image sensor may connect to and cooperate with an image pre-processor. Each image pre-processor may be multiplexed into a sensor selector and compositor module. An output of the sensor selector may connect to an image-scene-understanding-and-analysis module. An output of the image-scene-understanding-and-analysis module may connect to a predictive-and-adaptive-scene-modeling module, which feeds a sensor control unit, which couples and provides dynamic feedback to the image sensors.

As discussed, each image processor may contain or otherwise cooperate with at least its own image sensor with pixels. Each image pre-processor may have i) multiple image sensors, such as a quad sensor or i) a single image sensor but then the two or more image processors are configured to cooperate together in a distributed work architecture.

In an example, the two or more image processors cooperating in a distributed work architecture include a first image pre-processor that has its own image sensor with pixels, such as image sensor 1, and a second image pre-processor that has its own image sensor with pixels, such as image sensor 2, etc. These two or more image pre-processors may cooperate together in a distributed work architecture to capture any of i) different regions per image processor, ii) overlapping regions with one image processor capturing a base video for the first image frame, and iii) any combinations of both.

Figure 4:
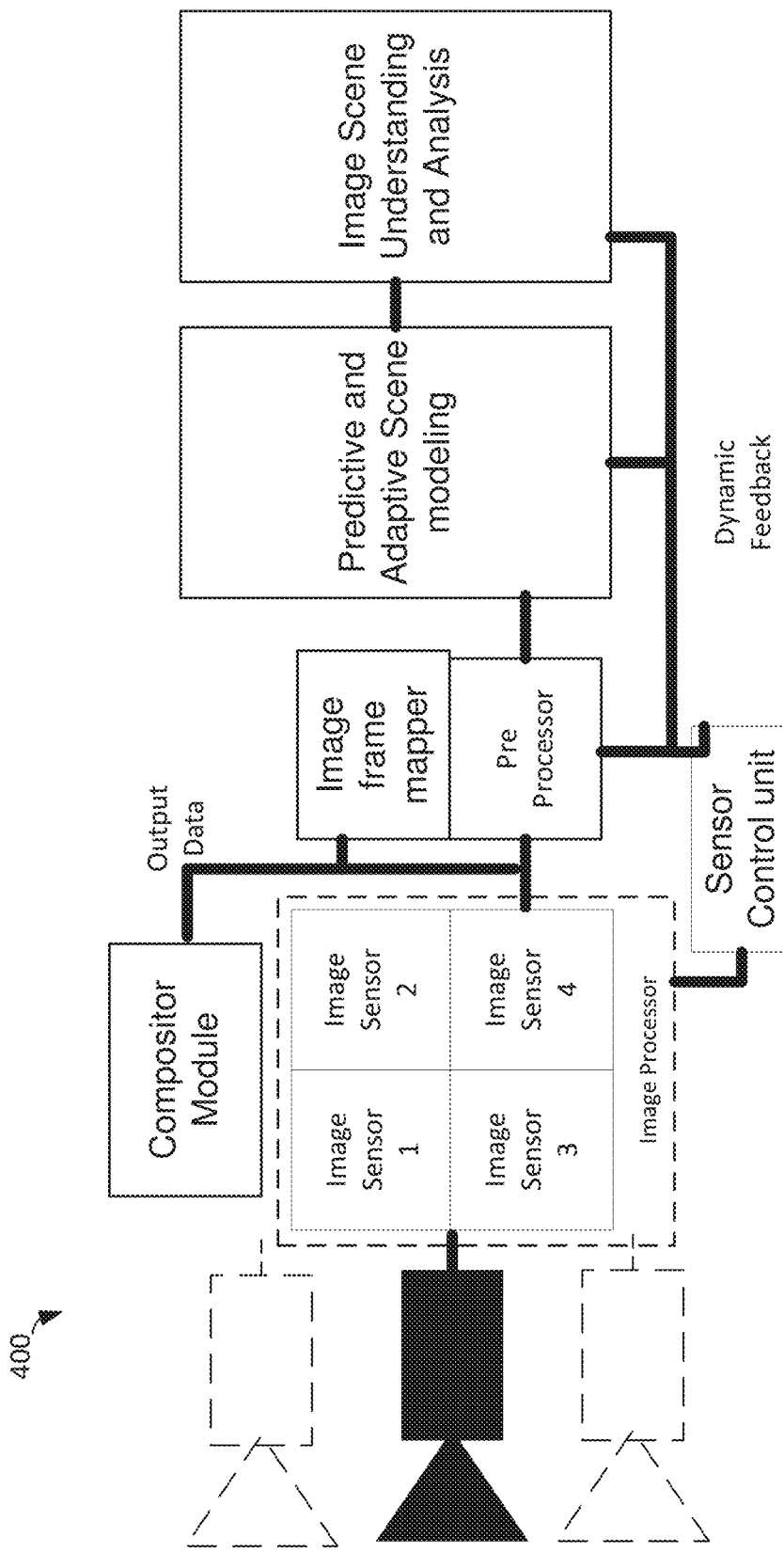
FIG. 4 illustrates a block diagram of an embodiment of a smart vision architecture for enhanced imaging based on semantic processing and dynamic scene modeling.

Again, the image processors may also include an image processor that has multiple independent imager sensors, such as a quad sensor (e.g. See FIG. 4).

The regions refined by the processing are driven by objects of interest in the scene not just tiled regions of the scene. The scene understanding algorithms identifies important objects and then defines regions around those objects that will have their parameters optimized. The regions can be anywhere within the scene and they are driven by the object size and the minimum resolution of the region definition of the imager.

The sensor control unit may cooperate with the image sensors to create multiple regions within a single image frame for the one or more image pre-processors. Thus, multiple regions within one image frame (e.g. See FIG. 3). Each region capturing that image frame contains its own set of pixels to capture pixel data. The sensor control unit may cooperate with the one or more image pre-processors to be capable of changing a mode of operation for each region of pixels to control pixel parameters for that region. The pixel parameters may include any of a frame rate, a resolution, an image size, an integration time, etc. The image processors may set the pixel parameters for pixels in, for example, a first region, in the multiple regions, to be different in pixel parameters than pixels in a second region within that same image frame.

In contrast to applying high performance parameters across the entire frame, this current approach allows application developers to optimize image information quality for simultaneous local resolution, dynamic range, and frame rate within numerous regions of each image/within a single image being captured. Additionally, to support the need of minimizing output data rates, the pixel parameter optimization can also reduce resolution, frame rate and dynamic range in non-salient regions of that image.

A predictive-and-adaptive-scene-modeling module may track trends in one or more prior image frames to assist in understanding what is contextually happening in an image frame. The one more image processors may change the mode of operation for each region; and thus, change pixel parameters such as frame rate, image size, integration time, etc., for pixels in that region, based on i) a contextual understanding of what contextually was happening in the one or more prior image frames and ii) whether salient items are located within the first region or second region or both. Pixel parameters for pixels in, for example, the first region are configured to be operating differently than the pixel parameters for pixel data being collected out of, for example, the second region for that same first image frame. A bi-directional communication loop exists between the predictive-and-adaptive-scene-modeling module and the sensor control unit i) to identify salient (e.g. important items in terms of image quality) in one or more regions in the prior image frames and/or ii) to predict salient items in one or more regions in a current image frame or a future image frame, and then send guidance to the sensor control unit to change pixel parameters for the set of pixels in the first region to be different than the set of pixels in the second region based on the presence or predicted presence of salient items being in, for example, the first region and not in the second region.

This design analyzes real-time image scene dynamics, scene activities, and developing semantic reasoning while simultaneously adjusting image sensor pixel parameters to maximize scene information. The design leverages image sensor devices recently available that support controlling local pixel parameters independently rather than globally as in most COTS imagers today. The design ties image processing feedback based on scene analysis, to local parameters in the image sensor. The design includes measures to predict upcoming imaging parameter changes through maintaining numerous image data models to support predictive scene understanding.

Inherent to the design is adaptive control of output data bandwidth based on the fact that image scenes always have a distribution of salient and non-salient information. Balancing knowledge of where and what type of salient and non-salient information occupy different regions within an image frame, the size of pixel data output from an image sensor can be greatly reduced, as needed, to meet the system's available power, processing resources and network bandwidth capabilities.

FIG. 1 graphically shows an embodiment where multiple image sensors, all with a similar field of regard, are controlled adaptively to maximize the actionable visual information in a displayed scene.

Each image sensor may have a predominate attribute (e.g., High Dynamic Range, High Frame Rate, HSR) whose pixel parameters (e.g., frame rate, image size, integration time) may be adaptively controlled.

All image sensor outputs are preprocessed to optimize downstream analysis. For instance, noise reduction, NUC and contrast normalization may be performed in the step. Also, several exposures from the HDR sensor may be processed to produce a single HDR frame.

The Sensor Selector selects one sensor's pixel data output (e.g., HDR) for analysis. Analysis may include scene segmentation, scene classification and activity detection. This Sensor Selector module produces two pixel data outputs:

- Adaptive sensor parameter settings: these are used to optimize visual information in certain scene regions of interest. For instance, if it is desired to have increased spatial resolution in a certain region, the HSR image sensor may be able to provide this, albeit at a lower frame rate.
- Adaptive Region Of Interest settings: these determine which image sensor's pixel data output will be used as the background, and which other image sensor's pixel data output will be cropped and pasted into the background video to optimize actionable visual information in the composited scene.

The compositor module may i) accept multiple region's from potentially multiple sensor inputs, and use frame buffers to ii) align pixel data for each region's output spatially, and iii) align pixel data for each region's output temporally, and then iv) to crop and paste the pixel data from one or more selected region's output pixel data onto a background video base for the first image frame. The compositor module may use adaptive Region Of Interest (ROI) settings to determine which region's output will be used as a background base for the image frame, and which other region's pixel output data will be cropped and pasted into the background base for the image frame when capturing regions with salient items in that region.

The compositor module may collect all of the image pixel data from all of the regions making up an image frame, and then the compositor module is configured to reassemble image pixel data, from at least the various regions collected on different cycles, for the image frame based on a identifier correlating to that image frame.

The Adaptive ROI Settings for the background and window control come from the sensor control unit. In addition, ancillary data sources, such as maps, GPS, IMU, can also be used to guide the selection of background and ROIs.

Note, real-time spatial alignment may not be needed if the image sensors are pre-calibrated with known Field Of Vision (FOV). They only need to be calibrated once (for fixed FOV) or whenever the FOV changes (e.g., if any lens focal length changes).

Overall, the digital imagers/cameras can apply high performance parameters merely across one or more portions making up the entire frame but need not apply similar pixel parameters across the entire frame. Note, this local control of individual pixel regions within an image sensor or across multiple image sensors working in a distributed fashion, the sensor control unit may augment each image controller's and pre-processor's own pixel parameter controller. A second controller in each image controller's and associated pre-processor can make global changes to pixel parameters for all of the pixels based on at least environmental lighting conditions, camera frame rate settings, selected mode of operation of that camera, etc. that will generally be applied uniformly across all of the regions containing pixels in that image sensor.

The smart vision system analyzes the scene dynamics with one or more artificial intelligence models to identify and/or predict salient items of interest in one or more regions of interest in order to create simultaneous adjusting of the pixel parameters in individual regions making up an image frame based on i) the type item of identified or anticipated and ii) a contextual understanding what is going on between items in the scene in order to maximize the scene information in those regions containing salient items and then controlling the output data bandwidth by maintaining or decreasing scene information in regions containing non-salient items. This contextual understanding what is going on between items in the scene also allows not performing oversampling for the image frames.

The predictive-and-adaptive-scene-modeling module may cooperate with the image-scene-understanding-and-analysis module to analyze each image frame to maintain image data models to identify salient items and predict local region characteristics such as dynamic range, local object motion, object or events and local resolution requirements. Based on the identification of each region's needs, the image processing rapidly feeds back pixel parameters to the image sensor(s) to simultaneously optimize different salient or non-salient regions within the same image frame for specific pixel parameters (e.g. resolution, frame rate and dynamic range).

The artificial intelligence models will use both i) the current information in captured in the frame as well as ii) information captured in any sequence of previous frames leading up to the current frame in order to predict what objects of interest may be in the scene and to gather an overall understanding of what's occurring in the scene that is about to be captured in the current image frame. Thus, the system makes dynamic feedback changes to the image pixel parameters for different regions of interest. This also builds up a predictive model of what's occurring in the scene, which tracks the types of items in the scene.

The artificial intelligence (AI) models can be trained using artificial intelligence algorithms (e.g. backpropagation, gradient descent) to recognize object and scene context. The AI models can include a neural network (e.g. RNN—recurrent neural networks) that can learn spatial-temporal information (e.g. video clips) to recognize activities of objects in the scene. The AI models may be trained to perform tasks such as scene segmentation (e.g. separating an captured image frame into foreground, background, air/ground, regions). The AI models may be trained as an attention mechanism by prioritizing and selecting a region or set of regions. The AI models may include AI models that are pre-trained with data from other sources to recognize objects. The AI models may use, as inputs, other sensor information (e.g. GPS, accelerometers, maps) to generate the contextual understanding of the scene.

Within an image frame, multiple items, such as objects, will be identified as well as an activity occurring within that image frames or series of image frames. The image-scene-understanding-and-analysis module may identify the items in the image frame as well as their current action and pass this information on. The predictive-and-adaptive-scene-modeling module then may develop a contextual understanding the items identified in the image frame as well as their current action or anticipated action. For example, in FIG. 7, the tracked image frames may need their frame rate generally increased because motion is associated with them or in FIG. 3 the resolution needs to be increased in order to pick up fine details of a face or some text.

Figure 2:
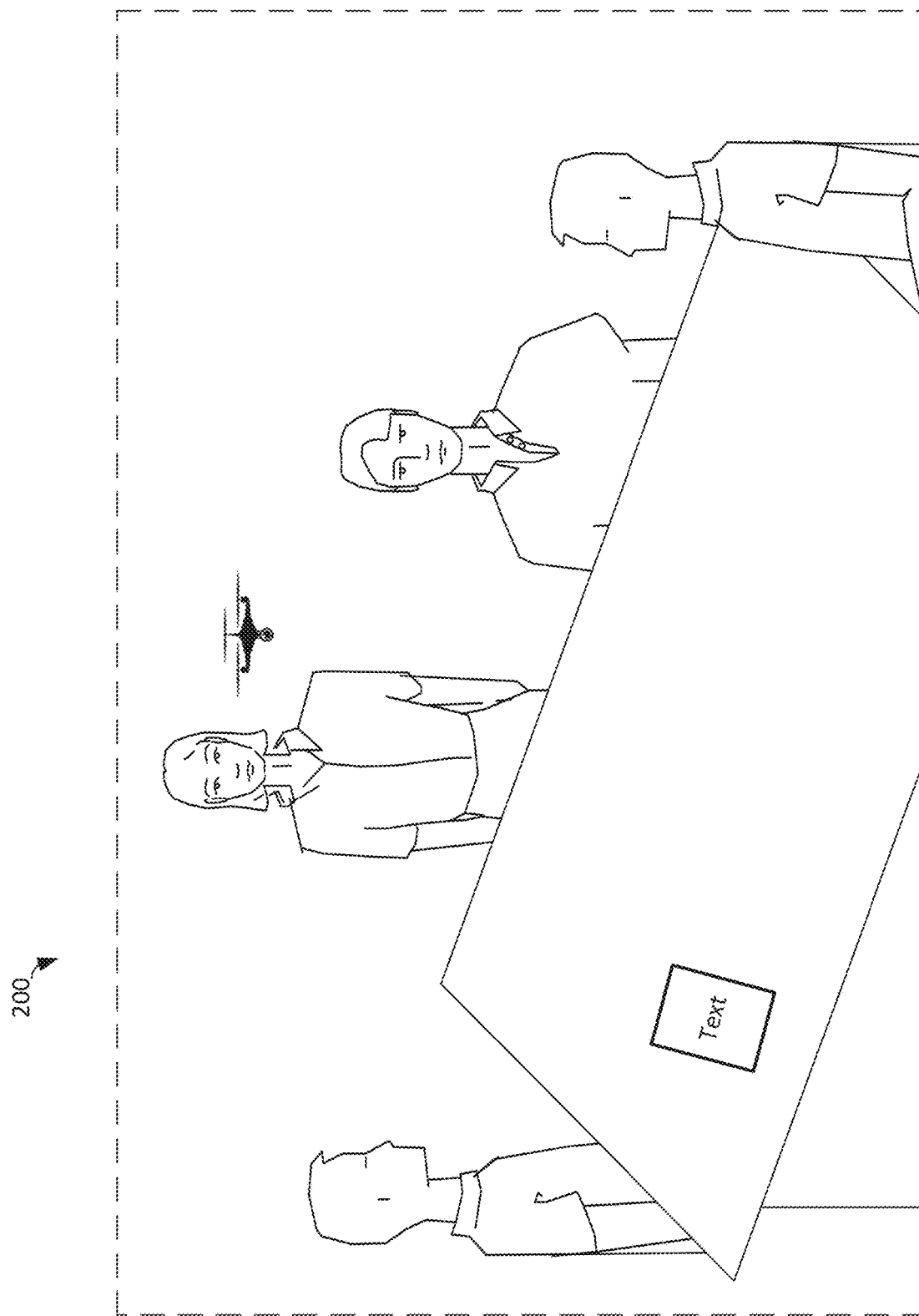
FIG. 2 illustrates a block diagram of an embodiment of an image frame capturing a scene of a family of four people sitting around a table with an aerial drone hovering above the left shoulder of the mom.

FIG. 2 illustrates a block diagram of an embodiment of an image frame capturing a scene of a family of four people sitting around a table with an aerial drone hovering above the left shoulder of the mom. The image frame 200 further contains the text of the instructions for the drone are sitting on top of the table by a boy to the right of the mom.

Figure 3:
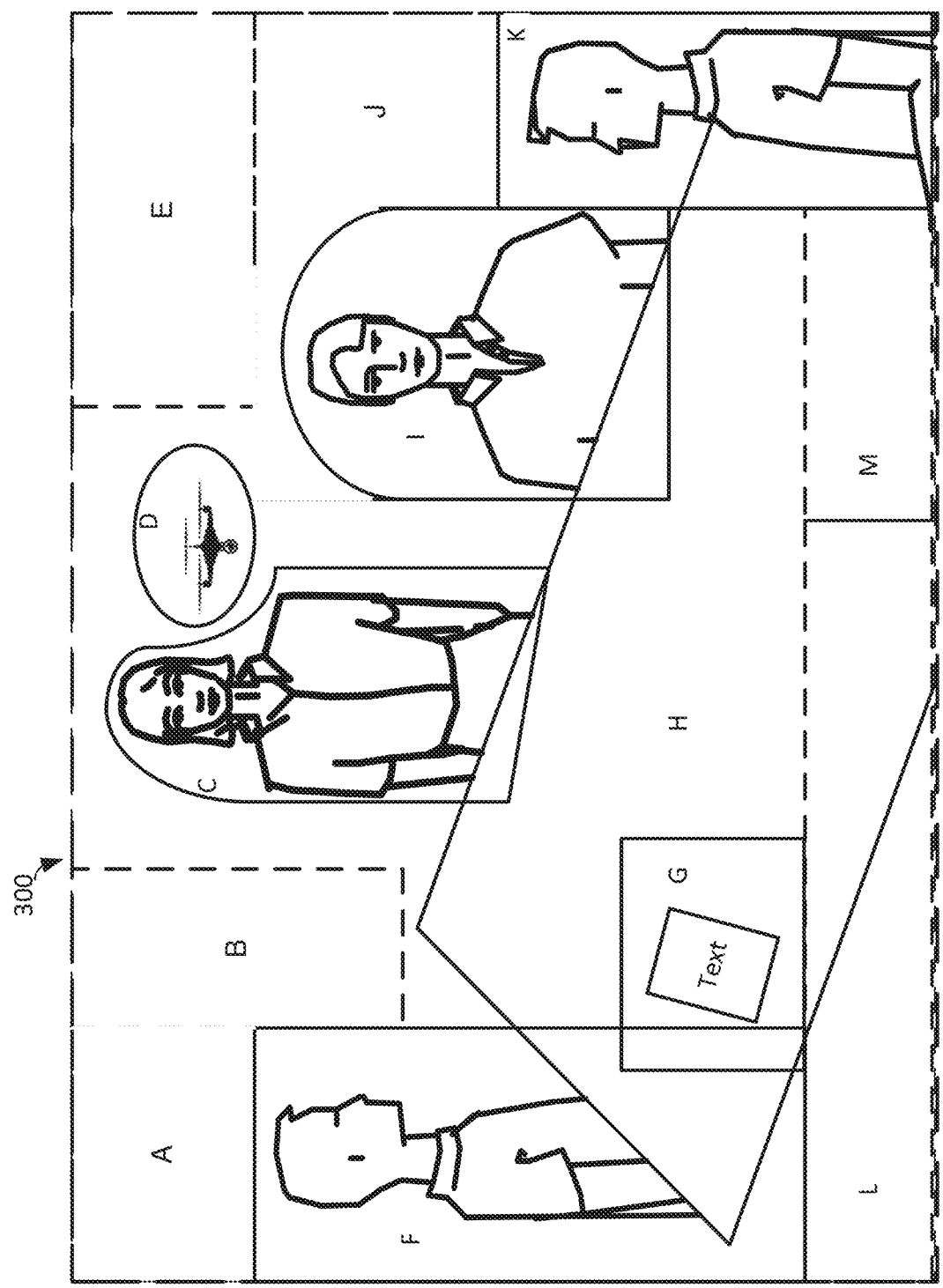
FIG. 3 illustrates a block diagram of an embodiment of the scene divided into regions of interest captured in the image frame of FIG. 2.

FIG. 3 illustrates a block diagram of an embodiment of the scene divided into regions of interest captured in the image frame of FIG. 2. This single image frame 300 is divided up into regions of interest, regions C, D, F, G, I, and K, and other regions not containing any salient items, regions A, B, E, J, L and M. As discussed, pixels in a single image sensor may form the multiple regions of interests from multiple image sensors working in a distributed architecture. In the prior image frames, the image-scene-understanding-and-analysis module and the predictive-and-adaptive-scene-modeling module cooperated to identify items of saliency, such as each of the family of four people sitting around the table with the aerial drone hovering above the left shoulder of the mom. The module also identified the sheet of text/instructions for the drone sitting on top of the table. The image-scene-understanding-and-analysis module and predictive-and-adaptive-scene-modeling module cooperate to automatically monitor local scene content and action to ensure optimized near-instantaneous adjustments to how the pixels will capture subsequent scene information. For example, generally in images it is important to be able to see the text on a street sign, document, shirt, etc. Thus, the instruction document with text in this example, because the image-scene-understanding-and-analysis module identifies the text and knows blurry text negatively affects image quality, then the predictive-and-adaptive-scene-modeling module knows the resolution for region G containing those instructions should be increased over the default values. Likewise, for each of the objects identified as people in the scene, the semantic reasoning algorithms will adjust the different regions of interest settings for higher spatial resolution so facial features can be better captured. Thus, at least in regions C, D, F, G, I, and K will have the settings for spatial resolution increased over the default values. For the aerial drone, region D, and potentially each neighboring region, regions C, E, and J, will have the settings for frame rate and spatial resolution increased over the default values so motion and other detailed features can be better captured. In neighboring regions of objects in motion, the neighboring region can have the pixel parameters increased based on the anticipation of the potential movement of the object. On the other hand, regions A, B, E, J, H, L, and M do not readily contain salient items, so the default values, or even a setting below the default values, for the pixel parameters of these regions can be used for these regions. To support managing data bandwidth and not oversampling the entire image frame, the scene understanding algorithms recognize little to no image content exists in regions A, B, E, J, L, and M so these regions can have their resolution, frame rate and dynamic range minimized until a demand is called for. The algorithms continually monitor scene information with features, determine their saliency and type, and adjust pixel parameters to enable imaging of these high dynamic range scenes with a maximum quality allowed based on available system resources at that time. The algorithms in the modules perform real-time predictive scene modeling and understanding to ensure timely imager response. The algorithms in the modules perform analysis and object recognition to understand scene structure (e.g. in-doors) to help detect salient items, such as drones and people, to set optimal pixel parameters for each region.

The two modules cooperate to analyze for small regions in an image frame 300, either a prior image frame or a current image frame, that need to be captured optimally with higher resolution, dynamic range and/or frame rate within that image frame while at the same time there are other less important regions where reduced detail may be required to be captured within hardware resources available, and all of these individual adjustments are dynamically occurring within a same image frame. Thus, this solution will dynamically manage how local regions of interest in an image frame 300 are imaged with respect to how image parameters such as resolution, frame rate and dynamic range are applied at a pixel level in an image sensor.

Note, the regions of interest may be rectangular or any other shape.

FIG. 4 illustrates a block diagram of an embodiment of a smart vision architecture for enhanced imaging based on semantic processing and dynamic scene modeling. The smart vision architecture 400 may use, for example, cameras with multiple image sensors.

The sensor control unit may simultaneously and independently control and adjust pixel parameters of i) imager resolution, ii) dynamic range performance and/or iii) frame rate, non-uniformly at regional increments across an entire image captured in an image frame by pixels in a pixel array. For example, the sensor control unit is configured to non-uniformly and independently i) increase at least one of 1) the imager resolution, 2) the dynamic range and/or 3) the frame rate within a first region with a salient item and increase at least a different pixel parameter of 1) the imager resolution, 2) the dynamic range and/or 3) the frame rate within a second region with a salient item based on i) a contextual understanding of what contextually was happening in one or more prior image frames and ii) whether salient items are located within the first region or second region.

The image processing unit may have a low-latency feedback communication loop from the image processing unit to the sensor control unit. The sensor control unit supplies pixel parameter feedback to the image processing unit in order to simultaneously and independently vary i) the imager resolution, ii) the dynamic range and/or iii) the frame rate within the different regions of interest in the image frame.

The predictive-and-adaptive-scene-modeling module couples to the sensor control unit i) to identify and/or ii) to predict salient items in one or more regions of interest in the image frame and then send guidance to the sensor control unit to i) increase at least one of 1) the imager resolution, 2) the dynamic range and/or 3) the frame rate within those regions with salient items. The predictive-and-adaptive-scene-modeling module can also send guidance to the sensor control unit to then either i) maintain or ii) decrease at least one of 1) the imager resolution, 2) the dynamic range, and/or 3) the frame rate within regions without salient items in order to stay within any i) bandwidth limitations ii) memory storage, and/or iii) power consumptions limitations imposed by 1) one or more image sensors or 2) the communication loop between the sensor control unit and the image processing unit.

The predictive-and-adaptive-scene-modeling module and an image-scene-understanding-and-analysis module cooperate with each other. The modules cooperate to analyze for the regions of interest in each image frame that need to be captured optimally with higher imager resolution, dynamic range, and/or frame rate within that image frame because they contain one or more salient items while simultaneously there are other less important regions of interest containing merely non-salient items where reduced image detail can be captured with a default pixel parameter setting for imager resolution, dynamic range and/or frame rate within the image frame in order to stay within the 1) any i) bandwidth limitations ii) memory storage, and/or iii) power consumptions limitations imposed by one or more image sensors with the pixels capturing the pixel data in region of interests making up the image frame, and 2) any i) bandwidth limitations ii) memory storage, and/or iii) power consump-

Predicting Pixel Parameter Changes

The predictive-and-adaptive-scene-modeling module may analyze and track trends in scene data changes in the one or more prior image frames. One or more scene models are maintained as predictive measures to monitor and track one or more salient items in different scene regions of interest in order to predict needed pixel parameter changes for upcoming image frames. The models track scene data so they can adjust pixel parameters best suited for that type of salient item. Based on the identification of each region's needs, the predictive-and-adaptive-scene-modeling module rapidly feeds back pixel or region based parameters to the sensor control unit and its image sensors to simultaneously optimize different salient or non-salient regions in the same frame for specific resolution, frame rate or dynamic range.

The modules apply semantic reasoning and modeling. The modules understand scene structure (e.g. roads or walls) that can help detect both develop semantic reasoning of the scene and then salient objects such as vehicles and pedestrians within that scene to set optimal local pixel parameter selection. The image-scene-understanding-and-analysis module identifies salient items (doors, signs, objects in motion, colors, bright scenes, people, obstacles, etc.) The predictive-and-adaptive-scene-modeling module uses scene segmentation that include:

- Using Deep Learning (DL) algorithms to label the salient objects in the scene.
- Similar to approaches in autonomous driving, except imager feedback is based on labeled objects.
- Identify regions requiring High Dynamic Range (HDR), HSR and motion compensation.
- Using real-time coupling between semantic-level algorithms for object detection providing non-uniform and independent of control pixel parameters within different regions of an image sensor.

The predictive-and-adaptive-scene-modeling module analyzes and tracks trends in scene data changes in each image frame. One or more scene models may be maintained as predictive measures to monitor and track scene regions of need of, for example, HDR or high frame rate/motion to predict upcoming imaging parameter changes. As these Artificial Intelligence (AI) models track scene data, the AI models can make suggestions to adjust imager parameters best suited for different types of salient items.

The image-scene-understanding-and-analysis module looks at the scene to identify sematic information from objects or events in the scene. The image-scene-understanding-and-analysis module analyzes the scene in order to identify objects and events occurring in the scene in the prior image frames and identify salient items within regions of the scene. This information can be from temporal or spatial analysis methods. Once the salient items are identified, then that information is passed onto the predictive-and-adaptive-scene-modeling module to ensure the apparatus is ready for rapid changes in the scene that the predictive-and-adaptive-scene-modeling module predicts will change in the scene.

The image-scene-understanding-and-analysis module and the predictive-and-adaptive-scene-modeling module cooperate to predict changes in the scene such as in FIG. 3 where the drone is hovering but will most likely move to a neighboring region of interest rapidly when it does move, so the modules send guidance to adjust pixel level settings such as frame rate, resolution and dynamic range for that type of salient item before the object actually performs or takes an anticipated action. Likewise, in FIG. 7, the predictive-and-adaptive-scene-modeling module can predict the two cars in regions J, and K, will move into region H in the next set of image frames; and thus, regions J, K, and H will need to have the frame rate increased for the pixels in those regions.

Figure 7:
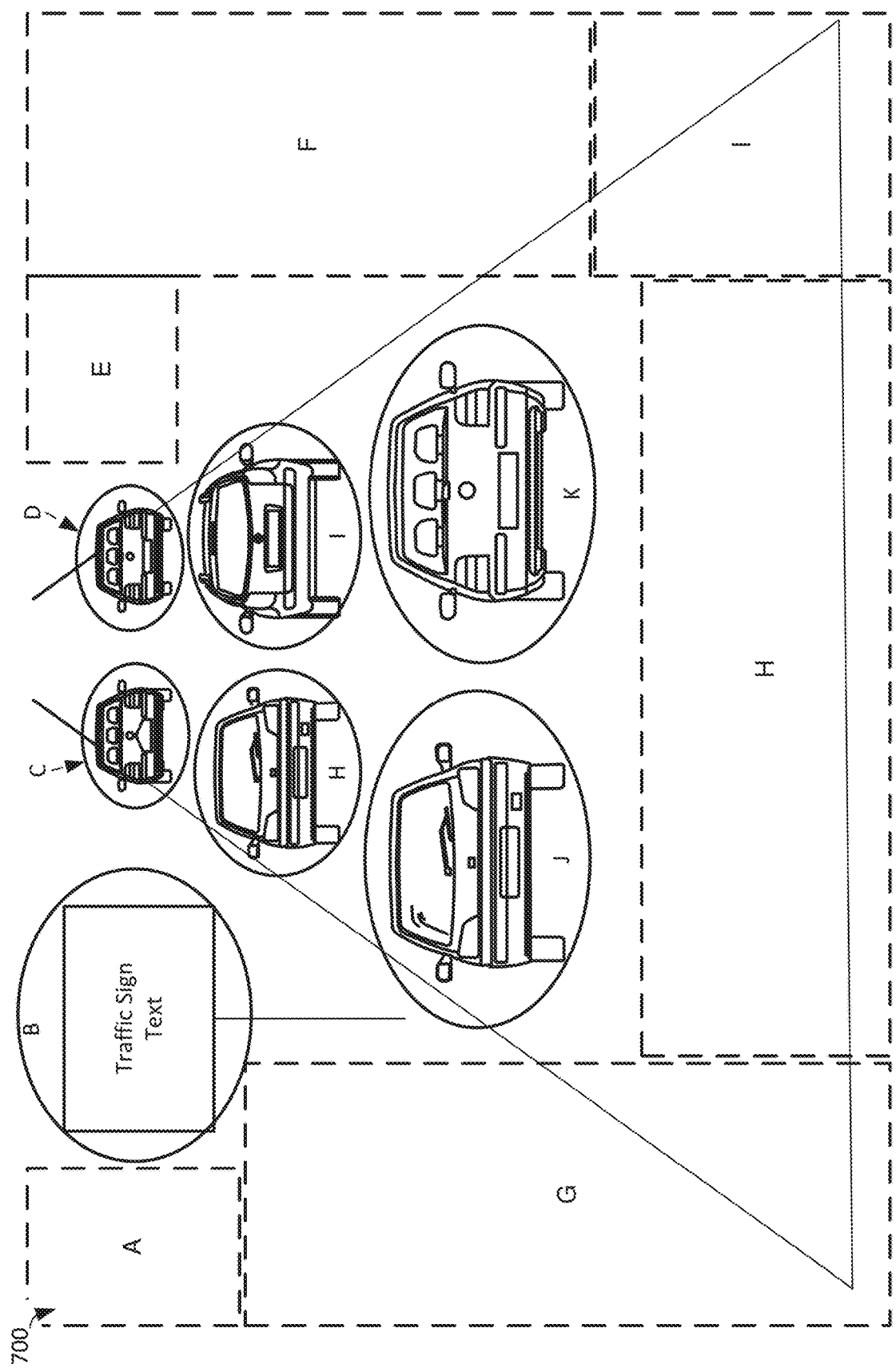
FIG. 7 illustrates a block diagram of an embodiment of the scene divided into regions of interest captured in the image frame of FIG. 6.

The predictive-and-adaptive-scene-modeling module ensures the image is ready for rapid changes in the scene by predicting changes in the scene such as in FIG. 3 where the drone may move to a neighboring region or FIG. 7 where the cars should move to a neighboring region following the contour of the road, so to start to adjust pixel level settings such as frame rate, resolution and dynamic range before it happens.

The predictive-and-adaptive-scene-modeling module may i) analyze each of the salient items as well as the items of non-saliency found or predicted to be in the prior image frames ii) compared to image and scene data models so that the predictive-and-adaptive-scene-modeling module may identify and predict pixel parameters best suited for that type of salient item. The predictive-and-adaptive-scene-modeling module may analyze one or more prior image frames by storing them in a database and comparing them to maintained image data models to identify and predict local region characteristics such as dynamic range, local object motion, object or events and/or local resolution requirements. The predictive-and-adaptive-scene-modeling module predicts local region characteristics such as dynamic range, local object motion, object or events and/or local resolution requirements as best suited for tracked or anticipated salient items in that region of interest. Based on the identification of each regions needs the image processing rapidly feeds back pixel or region based parameters to the imager to simultaneously optimize different regions with salient items and/or adjust regions with items that are non-salient in the same frame to stay within set thresholds values of specific resolution, frame rate or dynamic range values, as needed.

The predictive-and-adaptive-scene-modeling module looks at trends in scene data changes. If either bright sun or dark shadows are trending in an area of the image we want to adjust local regions/pixels parameters to prepare for upcoming dynamic range issues. Numerous scene models can be maintained as predictive measures to monitor and track scene regions of HDR or motion for example. As models track scene data they can adjust imager parameters. Models update continuously and in some cases bad models may drop or new models may be added to handle new conditions. Scene modeling is important to maintain low latency and dynamic feedback.

The predictive-and-adaptive-scene-modeling module may include measures to predict upcoming imaging parameter changes through maintaining numerous image data models to support predictive scene understanding and then identify and/or predict salient items and what type of salient items are in one or more regions of interest in the image frame, and then send guidance to the sensor control unit to i) increase at least one of the 1) imager resolution, 2) the dynamic range and/or 3) the frame rate, as best suited to the type of salient items within those regions with salient items. Imager settings in each pixel region are set based on object types (e.g. inferred semantic object).

Balancing Increasing Pixel Parameters in Some Regions while Maintaining or Decreasing Pixel Parameters in Other Regions within the Same Image Frame The predictive-and-adaptive-scene-modeling module may also then maintain or decrease at least one of 1) imager resolution, 2) the dynamic range and/or 3) the frame rate within those regions without salient items in order to stay within the i) bandwidth limitations ii) memory storage, and/or iii) power consumptions limitations imposed by 1) the image sensors or 2) the communication loop between the sensor control unit and the image processing unit.

The predictive-and-adaptive-scene-modeling module and the image-scene-understanding-and-analysis module can be configured to cooperate to i) analyze real-time image scene dynamics, analyze scene activities, and develop semantic reasoning of the scene, while ii) simultaneously determining pixel parameters for the sensor control unit to maximize scene information and send the pixel parameters to the sensor control unit to dynamically adjust the pixel parameters for pixels in the different regions of interest for a current image frame being captured.

In FIG. 7, the regions of interest are around the cars in the scene. The cars motion will be detected and/or a sign will be detected and then regions of interest will be defined around those objects.

The regions with moving cars, regions C, D, H, I, J, K and because of prediction region H are being captured with a higher frame rate. In addition, those same regions as well as region B with the street sign will be captured with a higher resolution to capture fine details of text and faces. Capturing all of these pixels based on real-time motion analysis will drive high frame rate and short integration times for these pixels. In addition, the imager will want to capture the text on the road sign and potentially license plates and images of drivers with greater resolution. Image sensors today cannot simultaneously capture scenes that have: high dynamic range (HDR), high spatial resolution (HSR), and rapidly moving objects. Regions A, E, F, G and I do not contain salient items and can have their pixel parameters maintained or decreased.

The modules cooperate to use local scene understanding and modeling to predict and rapidly adjust local pixel parameters to capture items within each frame. The modules cooperate to also simultaneously send guidance to locally adjust dynamic range, spatial resolution and reduce motion blur with locally higher frame rate while maintaining manageable output data rates. Thus, some regions need to maintain or decrease pixel parameters in other regions within the same image frame to stay within any i) bandwidth limitations ii) memory storage, and/or iii) power consumptions limitations imposed by 1) one or more image sensors or 2) the communication loop between the sensor control unit and the image processing unit.

The imager sensor and sensor control unit cooperate for pixel-level parameters control of how any given pixel will image (e.g. integration time, frame rate, resolution selection, etc.) and provide an automated and dynamic means for optimizing how local scene data and features are captured to ensure critical scene content is not lost due to slow changing imager parameters while balancing output data bandwidth capabilities of the hardware.

In most imaging applications, there are smaller regions in an image frame that need to be captured optimally while there are less important regions where reduced detail is required. The current solution will dynamically manage how local regions in a frame are imaged with respect to how image parameters such as resolution, frame rate and dynamic range are applied at a pixel level in an imager. There are at least two benefits from our approach:

(1) First, local image quality, features and detail can be dramatically improved. For example, improving local dynamic range can occur to see into deep shadows or bright sun, also capturing local motion at high frame rates can occur to improve image clarity, predicting a person will come through a door so you can capture their face optimally or adding resolution on a face to enhance facial recognition.

(2) Second, systems with lower SWaP (Size, Weight and Power) and manageable data bandwidth are needed. With this solution the amount of data output from an imager can be greatly reduced and enable future applications requiring reduced power, minimized processing resources and reduced network bandwidth.

Referring back to FIG. 3, in addition, the compositor module (such as a set of digital imagers) may stitch together items captured in the multiple region of interest within the single image frame using a identifier, for example, a time stamp from a common time line. The identifier is indicative of the image frame and included with data being collected from the pixels for each region of interest.

The pre-processing module may condition the imager output dynamic range for the next modules and pixel data trends. Some global gain level feedback to imager is possible for larger scene changes.

Note, the digital imager can be a camera taking a burst of still photos or a video recording, which are a series of images usually accompanied by audio.

The control unit can use location, including GPS as an input to optimize parameters in a certain region. E.g., Airborn UAV flying over an area—knows where it is; and thus, can define a region based on an area on the ground like an intersection for which get optimized parameters.

Figure 11:
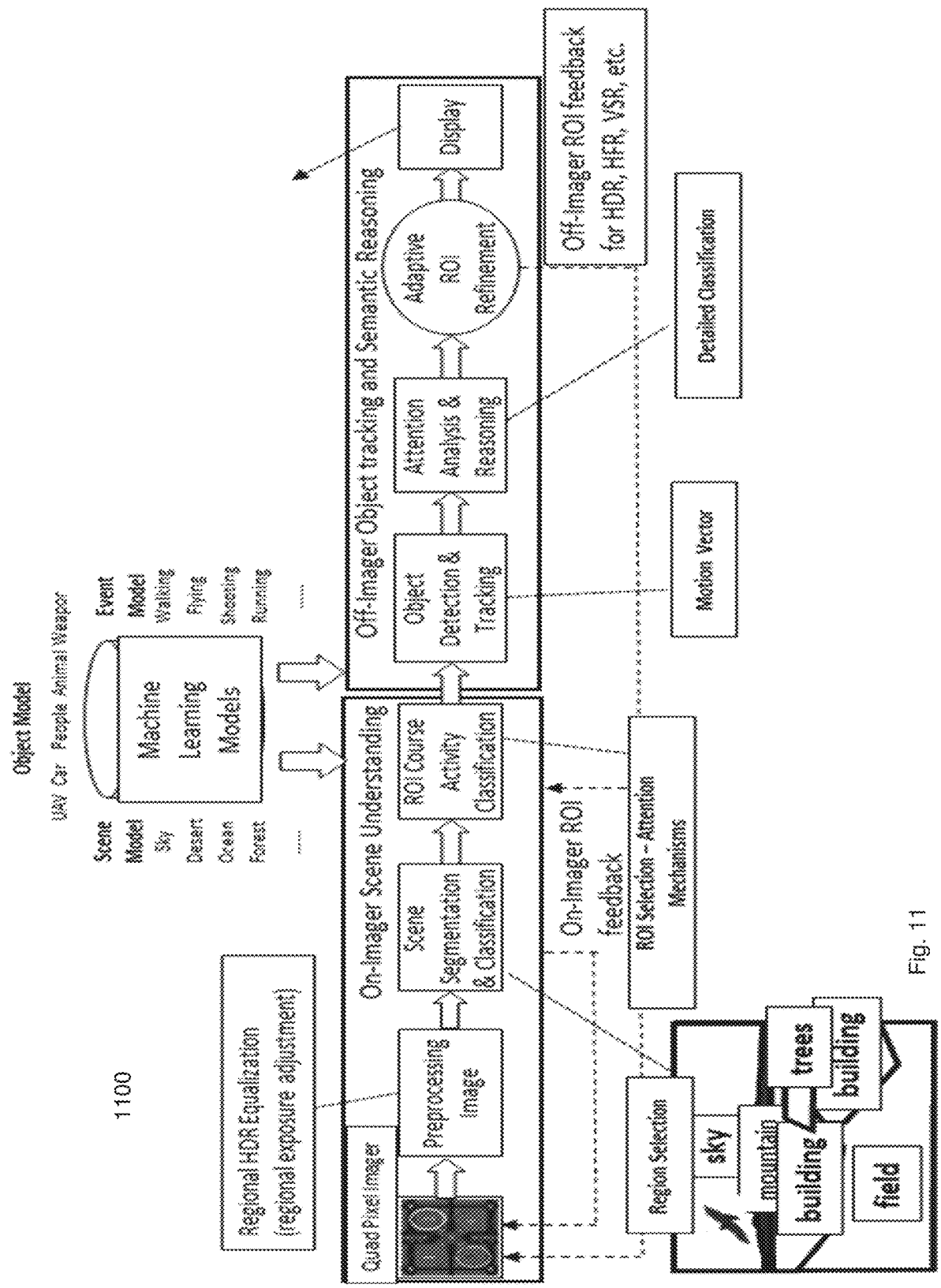
FIG. 11 illustrates a diagram of an embodiment of the system generating a semantic understanding of a scene, images, and predicted scenes.

FIG. 11 illustrates a diagram of an embodiment of the system generating a semantic understanding via dynamic scene modeling of a scene, images, and predicted scenes.

The system 1100 includes a number of models and modules working together. In this example, the quad pixel imager supplies pixel data to the pre-processing image module. The pre-processing image module sends its data to the scene understanding module, which has a scene segmentation and classification module and a region of interest course activity classification module. Machine learning models include a scene model, an object model, and an event model, which are used to supply information to the scene understanding module and the object tracking and semantic reasoning module. The scene understanding module sends it's information off to the object tracking and semantic reasoning module.

The system has the ability to dynamically, in real-time, understand what is going on in the scene and what is important information the sensors should capture and how the sensor should capture this information. A point to ensure the most important information is captured in the scene is ensuring the regions selected in the scene are important to the current mission or application. FIG. 11 shows an example scene understanding processing pipeline architecture for determining the regions and the algorithms that enable the dynamic and real-time region selections.

The initial scene understanding component of the pipeline is the scene segmentation and classification module where the major scene segments of a changing scene are defined (e.g. sky, ground). This information is important as it provides a logical understanding of what objects are found and where (e.g. cars not often found in the sky). An initial coarse ROI (Region of Interest) selection is determined after the scene segments, based on an attention mechanism and machine learning models that have trained classes based on a scene region in the scene. The attention mechanisms can be based on a range of cues (e.g. object motion, image edge shapes in specific scene regions). Actual classification of the objects and subsequent regions of interests does not occur until the classification stage. The scene segmentation declaration can also be triggered by other factors such as motion of objects (motion vector field) or image quality. The image quality is monitored and areas that may be very dark or very bright are considered regions that require adjusting image parameters through feedback to the imager.

The object tracking and semantic reasoning processing module and its various sub-blocks analyze and understand the regions of interests previously selected by attention mechanisms and if they are of important for a given application. By understanding objects and how they act and travel in the regions of interests in a scene can be further refined (e.g. planes don't fly like birds in the sky but UAV's could). With the refined regions of interests detailed classification can occur to label each region and format data for display and region labeled outputs.

Next, there are multiple stages of feedback to the smart vision sensor Quad Pixel architecture. Coarse feedback to the pixel imager parameters can occur early in the pipeline architecture to provide the best image quality prior to processing followed by region based feedback based on knowing objects in regions of interest (e.g. person walking in shadow therefore adjust parameters in region for improved dynamic range and spatial resolution to support facial recognition). The upfront parameter adjustment on coarse region selection must be rapid and low latency (e.g. <1 millisecond) while the semantic reasoning and understanding feedback may occur after a frame or two.

Another component of the ability to ensure all important information is captured is the use of predictive image processing. For example, when the system is tracking an object from a stationary or moving platform, the system will be able to compute the area of the sensor a moving object will get to over the next few frames. With this understanding the pipeline architecture can adjust the parameters to the pixels for the moving object to ensure the optimal information is obtained when captured. The predictive capability also help tracking objects as they are occluded by other objects in a scene.

Figure 5:
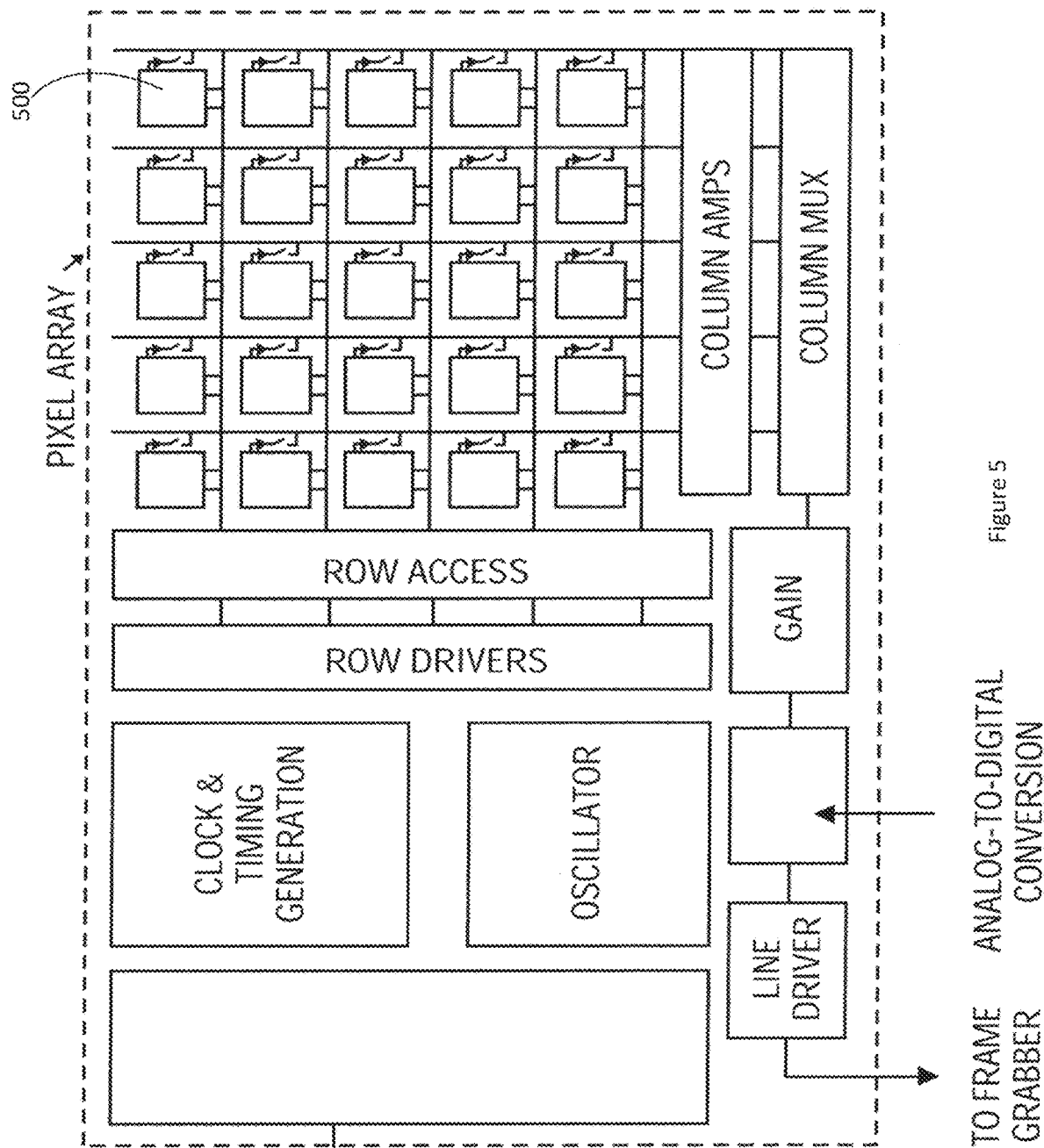
FIG. 5 illustrates a block diagram of an embodiment of an example image sensor with its pixel array, clocking circuit, and other control circuitry.

FIG. 5 illustrates a block diagram of an embodiment of an example image sensor 500 with its pixel array, clocking circuit, and other control circuitry.

Figure 6:
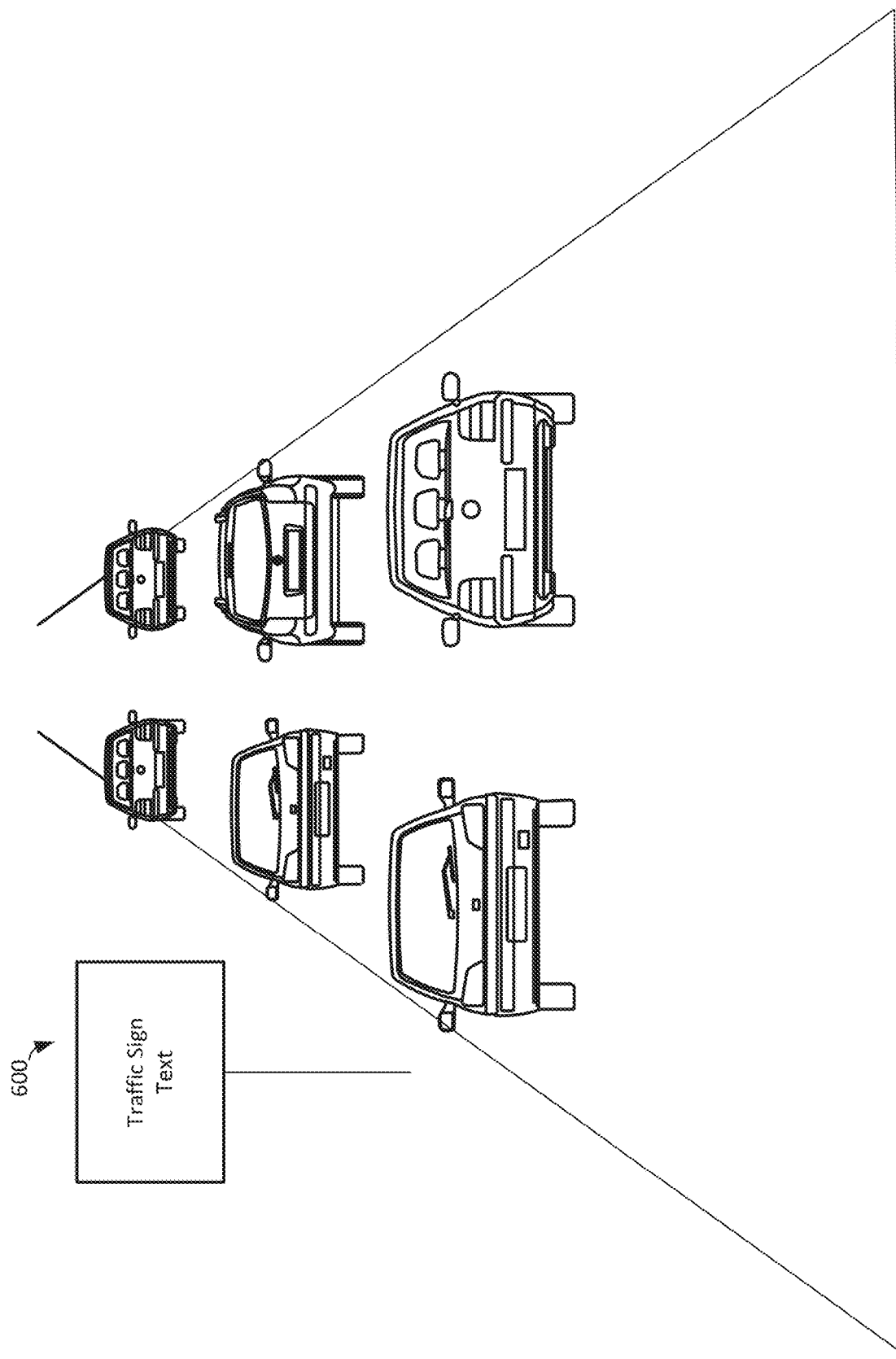
FIG. 6 illustrates a block diagram of an embodiment of an image frame capturing a scene of automobiles driving on a roadway.

FIG. 6 illustrates a block diagram of an embodiment of an image frame 600 capturing a scene of automobiles driving on a roadway.

FIG. 7 illustrates a block diagram of an embodiment of the scene 700 divided into regions of interest captured in the image frame of FIG. 6. This single image frame is divided up into regions of interest, regions B, C, D, H, I, J, and K, which capture cars, road signs, and roadway in various regions. Other regions A, E, F, G, and I are regions without any salient items and can utilize reduced pixel parameters, if needed.

Additional ways to implement portions of the image-scene-understanding-and-analysis module and/or predictive-and-adaptive-scene-modeling module can be found in U.S. Pat. No. 8,830,360, titled "Method and apparatus for optimizing image quality based on scene content," U.S. Pat. No. 8,861,842, titled "Method and apparatus for real-time pedestrian detection for urban driving," U.S. Pat. No. 8,712,096, titled "Method and apparatus for detecting and tracking vehicles," U.S. Pat. No. 8,634,638, titled "Real-time action detection and classification," and patent publication 2014/0347475, titled "Real-time object detection, tracking and occlusion reasoning."

FIGS. 8A and 8B illustrate a flow diagram of an embodiment of enhancing imaging based on semantic processing and dynamic scene modeling. The flow diagram can be used for describing the method and the steps that may be performed out of literal order when logically possible, and not all of the steps need to be performed.

In step 802, the system tracks trends in prior image frames, referencing scene data models, and utilizing one or more artificial intelligence algorithms to understand what is contextually happening in the first image frame, and then changing the image pixel parameters to increase pixel parameters in the first region while simultaneously maintaining or reducing image pixel parameters in the second region based on i) the contextual understanding of what contextually was happening in the prior image frame and ii) whether salient items are predicted to be located within the first region and not located in the second region.

In step 804, the system optimizes quality of image information with a sensor control unit to simultaneously independently control pixel parameters of i) local resolution, ii) dynamic range, and iii) frame rate within numerous regions of a single/first image frame based on i) any of a contextual understanding of at least what contextually was happening in a prior image frame, a contextual understanding of a scene, and a contextual understanding of an anticipated scene and ii) whether salient items are located within any of a first region of the first image frame and a second region of the first image frame, where pixel parameters for pixels in the first region are configured to be operating differently than the pixel parameters for pixel data being collected out of the second region for that same first image frame.

In step 806, the system adjusts output pixel data rates with the sensor control unit to increase pixel parameters of any of i) the local resolution, ii) the dynamic range, and iii) the frame rate for pixels in the first region while simultaneously maintaining or reducing any of i) the local resolution, ii) the frame rate, and iii) the dynamic range in the second region, which contains non-salient items contained in the first image frame.

In step 808, the image information quality is optimized while staying within 1) any i) bandwidth limitations ii) memory storage, and/or iii) power consumptions limitations imposed by one or more image sensors with the pixels capturing the pixel data in regions making up the first image frame, and 2) any i) bandwidth limitations ii) memory storage, and/or iii) power consumptions limitations imposed by a communication loop between the sensor control unit and the image sensors.

In step 810, the image pixel data for the first region is being collected from those pixels in a different collection cycle (at a different point in time) than the image pixel data from the pixels in the second region for that same image frame.

In step 812, the system uses the sensor control unit to apply increased performance pixel parameters to merely pixels collecting pixel data across one or more portions making up the entirety of the first image frame but not across the entire first image frame; and thus, some pixels making up the entire image frame are operating at lower performance pixel parameters simultaneously while the other pixels are performing at the increased performance pixel parameters based on i) the contextual understanding of any of a contextual understanding of at least what contextually was happening in a prior image frame, a contextual understanding of a scene, and a contextual understanding of an anticipated scene and ii) whether salient items are located within any of the first region of the first image frame, the second region of the first image frame, or both the first and second regions.

In step 814, the system uses a separate controller to make global changes to pixel parameters for all of the pixels making up the entire first image frame based on at least environmental lighting conditions.

In step 816, the system uses using a compositor module to collect all of the image pixel data from all of the regions making up the first image frame, and then reassembling image pixel data, from at least the first region and the second region collected on different cycles, for the first image frame based on the identifier correlating to the first image frame.

Network

Figure 9:
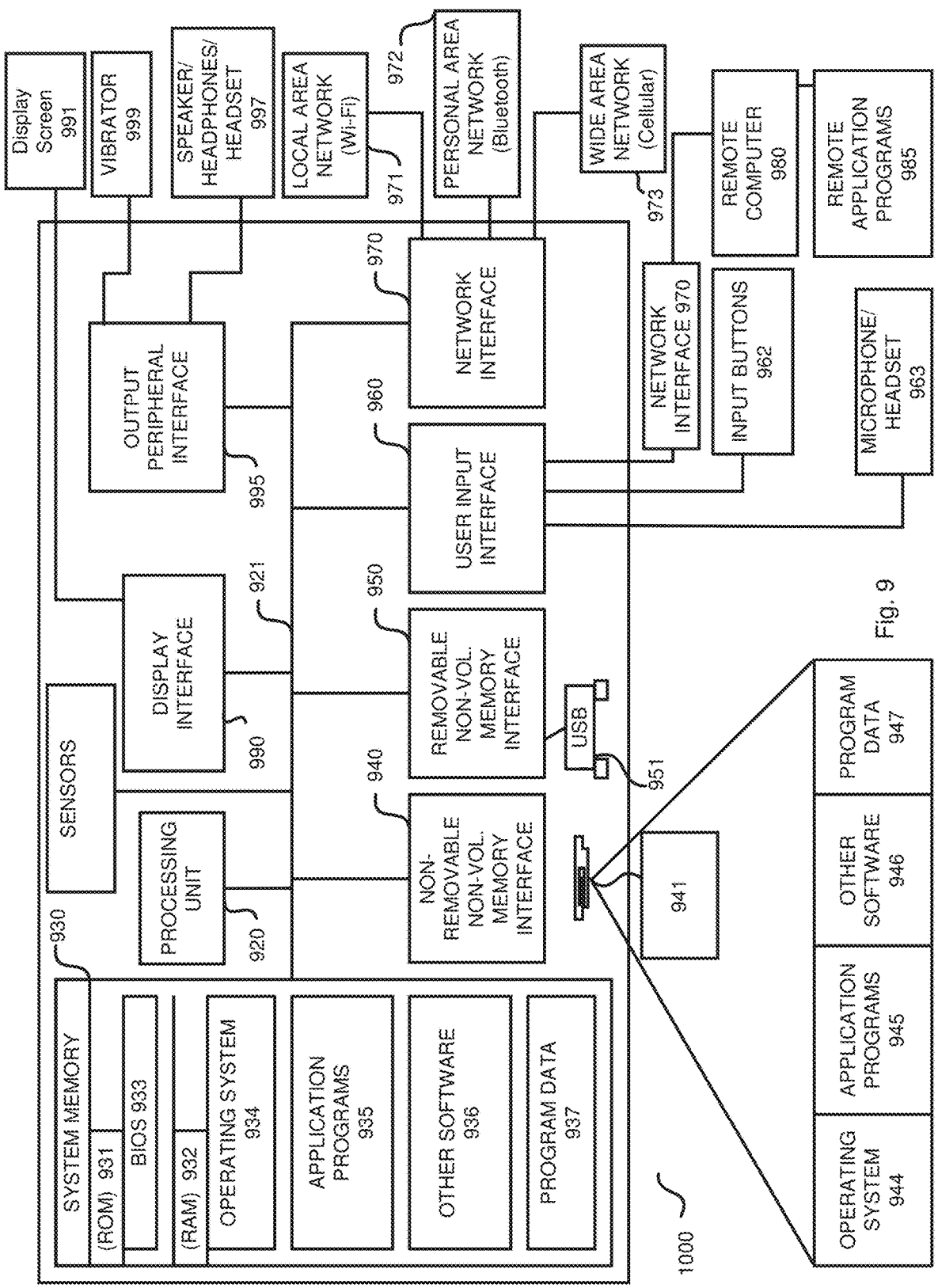
FIG. 9 illustrates a number of electronic systems and devices communicating with each other in a network environment in accordance with an embodiment of the design discussed herein.

FIG. 9 illustrates a number of electronic systems and devices communicating with each other in a network environment in accordance with an embodiment of the design discussed herein. Portions of the modules can be located in the cloud provider platform 904 while other portions of the system including image sensors may be located on the client devices such as the mobile computing devices 902A-902F.

The network environment 900 has a communications network 910. The network 910 can include one or more networks selected from an optical network, a cellular network, the Internet, a Local Area Network ("LAN") including Wi-Fi, Bluetooth, etc., a Wide Area Network ("WAN"), a satellite network, a fiber network, a cable network, and combinations thereof. In an embodiment, the communications network 910 is the Internet. As shown, there may be many server computing systems and many client computing systems connected to each other via the communications network 910. However, it should be appreciated that, for example, a single client computing system can also be connected to a single server computing system. As such, this Figure illustrates any combination of server computing systems and client computing systems connected to each other via the communications network 910.

The communications network 910 can connect one or more server computing systems such as a first server computing system 904A, a second server computing system 904B, a virtual reality headset 904C, a first smart television 902H, etc., to each other and to at least one or more client computing systems as well. The server computing systems 904A and 904B can each optionally include organized data structures such as databases 906A and 906B. Each of the one or more server computing systems can have one or more virtual server computing systems, and multiple virtual server computing systems can be implemented by design. Each of the one or more server computing systems can have one or more firewalls to protect data integrity.

The at least one or more client computing systems can be selected from a first mobile computing device 902A (e.g., smartphone with an Android-based operating system), a second mobile computing device 902E (e.g., smartphone with an iOS-based operating system), a first wearable electronic device 902C (e.g., a smartwatch), a first portable computer 902B (e.g., laptop computer), a third mobile computing device or second portable computer 902F (e.g., tablet with an Android- or iOS-based operating system), a smart device or system incorporated into a first smart automobile 902D, and the like. The client computing systems (e.g., 902A-902H) can include, for example, the software application and/or the hardware-based system in which the design discussed herein can be deployed.

It should be appreciated that the use of the terms "client computing system" and "server computing system" is intended to indicate the system that generally initiates a communication and the system that generally responds to the communication. For example, a client computing system can generally initiate a communication and a server computing system generally responds to the communication.

Any one or more of the server computing systems can be a cloud provider. A cloud provider can install and operate application software in a cloud (e.g., the network 910 such as the Internet), and cloud users can access the application software from one or more of the client computing systems. Generally, cloud users that have a cloud-based site in the cloud cannot solely manage a cloud infrastructure or platform where the application software runs. Thus, the server computing systems and organized data structures thereof can be shared resources, where each cloud user is given a certain amount of dedicated use of the shared resources. Each cloud user's cloud-based site can be given a virtual amount of dedicated space and bandwidth in the cloud. Cloud applications can be different from other applications in their scalability, which can be achieved by cloning tasks onto multiple virtual machines at run-time to meet changing work demand. Load balancers distribute the work over the set of virtual machines. This process is transparent to the cloud user, who sees only a single access point.

Cloud-based remote access can be coded to utilize a protocol, such as Hypertext Transfer Protocol ("HTTP"), to engage in a request and response cycle with an application on a client computing system such as a web-browser application resident on the client computing system. The cloud-based remote access can be accessed by a smartphone, a desktop computer, a tablet, or any other client computing systems, anytime and/or anywhere. The cloud-based remote access is coded to engage in 1) the request and response cycle from all web browser based applications, 2) the request and response cycle from a dedicated on-line server, 3) the request and response cycle directly between a native application resident on a client device and the cloud-based remote access to another client computing system, and 4) combinations of these.

In an embodiment, the server computing system 904A can include a server engine, a web page management component, a content management component, and a database management component. The server engine can perform basic processing and operating-system level tasks. The web page management component can handle creation and display or routing of web pages or screens associated with receiving and providing digital content and digital advertisements. Users (e.g., cloud users), can access one or more of the server computing systems by means of a Uniform Resource Locator ("URL") associated therewith. The content management component can handle most of the functions in the embodiments described herein. The database management component can include storage and retrieval tasks with respect to the database, queries to the database, and storage of data.

Computing Systems

Figure 10:
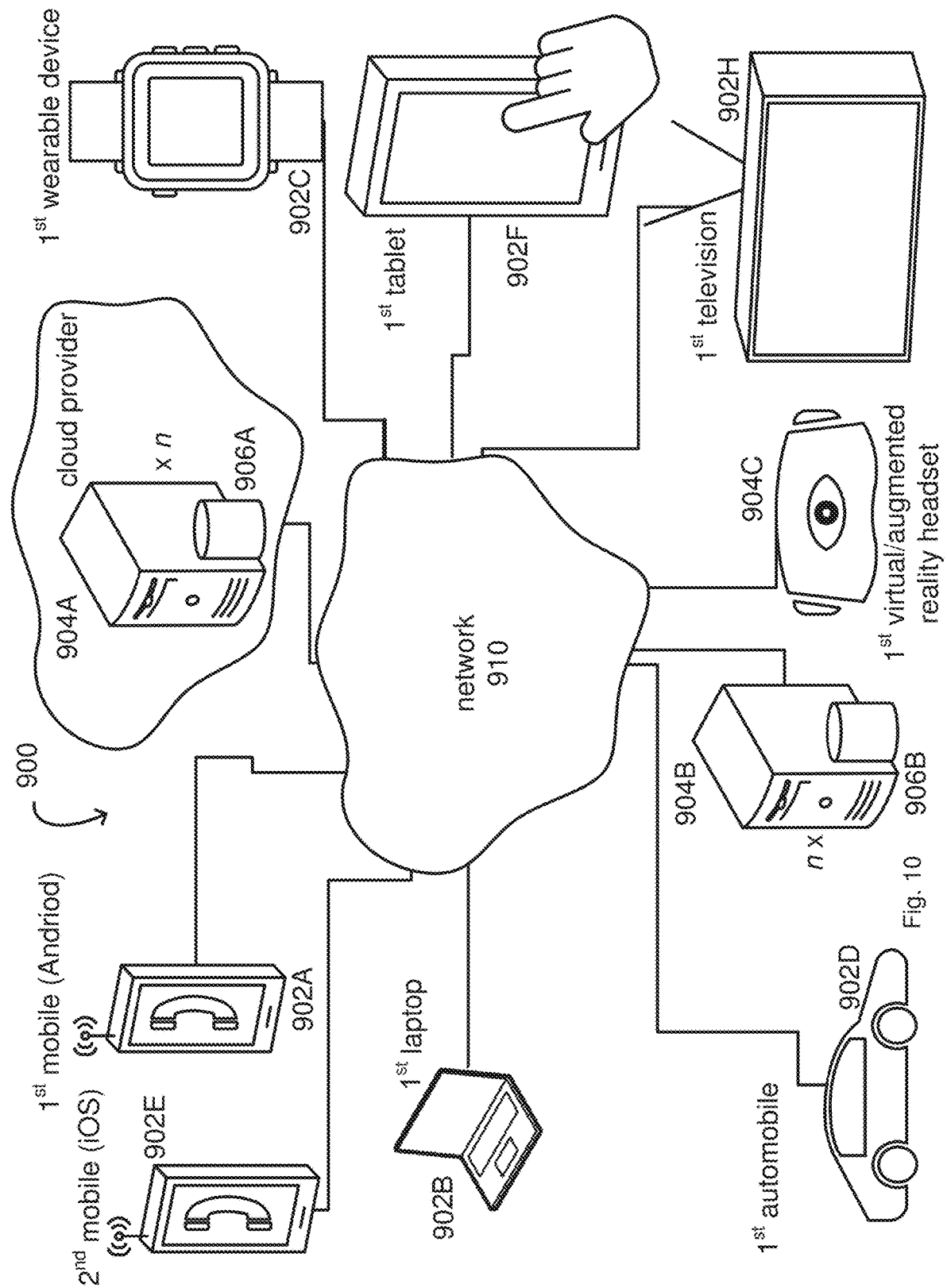
FIG. 10 illustrates a computing system 1000 that can be, wholly or partially, part of one or more of the server or client computing devices in accordance with an embodiment of the design discussed herein.

FIG. 10 illustrates a computing system 1000 that can be, wholly or partially, part of one or more of the server or client computing devices in accordance with an embodiment of the design discussed herein. With reference to FIG. 10, components of the computing system 1000 can include, but are not limited to, a processing unit 920 having one or more processing cores, a system memory 930, and a system bus 921 that couples various system components including the system memory 930 to the processing unit 920. The system bus 921 may be any of several types of bus structures selected from a memory bus or memory controller, a peripheral bus, and a local bus using any of a variety of bus architectures.

Computing system 900 typically includes a variety of computing machine-readable media. Computing machine-readable media can be any available media that can be accessed by computing system 900 and includes both volatile and nonvolatile media, and removable and non-removable media. The system memory 930 includes computer storage media in the form of volatile and/or nonvolatile memory such as read only memory (ROM) 931 and random access memory (RAM) 932. Transitory media such as wireless channels are not included in the machine-readable media. Communication media typically embody computer readable instructions, data structures, other executable software, or other transport mechanism and includes any information delivery media.

RAM 932 typically contains data and/or software that are immediately accessible to and/or presently being operated on by the processing unit 920. The RAM 932 can include a portion of the operating system 934, application programs 935, other executable software 936, and program data 937.

A user may enter commands and information into the computing system 900 through input devices such as a keyboard, touchscreen, or software or hardware input buttons 962, a microphone 963, a pointing device and/or scrolling input component, such as a mouse, trackball or touch pad. The microphone 963 can cooperate with speech recognition software. These and other input devices are often connected to the processing unit 920 through a user input interface 960 that is coupled to the system bus 921, but can be connected by other interface and bus structures, such as a parallel port, game port, or a universal serial bus (USB). A display monitor 991 or other type of display screen device is also connected to the system bus 921 via an interface, such as a display interface 990. In addition to the monitor 991, computing devices may also include other peripheral output devices such as speakers 997, a vibrator 999, and other output devices, which may be connected through an output peripheral interface 995.

The computing system 900 can operate in a networked environment using logical connections to one or more remote computers/client devices, such as a remote computing system 980. The remote computing system 980 can a personal computer, a hand-held device, a server, a router, a network PC, a peer device or other common network node, and typically includes many or all of the elements described above relative to the computing system 900. The logical connections depicted in this Figure can include a personal area network ("PAN") 972 (e.g., Bluetooth®), a local area network ("LAN") 971 (e.g., Wi-Fi), and a wide area network ("WAN") 973 (e.g., cellular network), but may also include other networks. Such networking environments are commonplace in offices, enterprise-wide computer networks, intranets and the Internet. A browser application or other native application that cooperates directly with an application on a remote server may be resident on the computing device and stored in the memory.

When used in a LAN networking environment, the computing system 900 is connected to the LAN 971 through a network interface or adapter 970, which can be, for example, a Bluetooth® or Wi-Fi adapter. When used in a WAN networking environment (e.g., Internet), the computing system 900 typically includes some means for establishing communications over the WAN 973.

It should be noted that the present design can be carried out on a computing system such as that described with respect to FIG. 9. However, the present design can be carried out on a server, a computing device devoted to message handling, or on a distributed system in which different portions of the present design are carried out on different parts of the distributed computing system.

In an embodiment, software used to facilitate algorithms discussed herein can be embodied onto a non-transitory machine-readable medium. A machine-readable medium includes any mechanism that stores information in a form readable by a machine (e.g., a computer). For example, a non-transitory machine-readable medium can include read only memory (ROM); random access memory (RAM); magnetic disk storage media; optical storage media; flash memory devices; Digital Versatile Disc (DVD's), EPROMs, EEPROMs, FLASH memory, magnetic or optical cards, or any type of media suitable for storing electronic instructions but not transitory signals.

Note, an application described herein includes but is not limited to software applications, mobile apps, and programs that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as Python, Java, HTTP, C, C+, or other similar languages. Also, an algorithm can be implemented with lines of code in software, configured logic gates in software, or a combination of both. In an embodiment, the logic consists of electronic circuits that follow the rules of Boolean Logic, software that contain patterns of instructions, or any combination of both.

Many functions performed by electronic hardware components can be duplicated by software emulation. Thus, a software program written to accomplish those same functions can emulate the functionality of the hardware components in input-output circuitry.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

What is claimed is:

1. A non-transitory computer readable medium, which stores instructions in an executable format by one or more processors to cause operations as follows, comprising:

capturing pixel data;
optimizing a quality of image information with a sensor control unit to simultaneously independently control pixel parameters of i) local resolution, ii) dynamic range, and iii) frame rate within numerous regions of a first image frame based on i) a contextual understanding of at least what contextually was happening in a previous image frame and ii) whether salient items are located within any of a first window region of the first image frame and a second window region of the first image frame, where pixel parameters for pixels in the first window region are configured to be operating differently than the pixel parameters for pixel data being collected out of the second window region for that same first image frame;
adjusting output pixel data rates with the sensor control unit to increase pixel parameters of any of i) a local resolution, ii) a dynamic range, and iii) a frame rate for pixels in the first window region while simultaneously maintaining or reducing any of i) the local resolution, ii) the frame rate, and iii) the dynamic range in the second window region, which contains non-salient items contained in the first image frame; and
setting pixel parameters for pixels in the first window region to be different in pixel parameters than pixels in the second window region within that first image frame; and thus, dynamically adjusting the pixel parameters for pixels in the first and second window regions being captured.

2. The non-transitory computer readable medium of claim 1, where the stored instructions in the executable format by the one or more processors are configured to cause further operations as follows,
where an image pixel data for the first region is being collected from those pixels at a different point in time than the image pixel data from the pixels in the second region for that same image frame.

3. The non-transitory computer readable medium of claim 1, where the stored instructions in the executable format by the one or more processors are configured to cause further operations as follows,
using the sensor control unit to apply higher performance pixel parameters to merely pixels collecting pixel data across one or more portions making up an entirety of the first image frame but not across the entire first image frame; and thus, some pixels making up the entire image frame are operating at lower performance pixel parameters simultaneously while the other pixels are performing at the higher performance pixel parameters based on i) the contextual understanding of at least what contextually was happening in the previous image frame and ii) whether salient items are located within any of the first window region of the first image frame, the second window region of the first image frame, or both the first and second window regions; as well as
using a separate controller to make global changes to pixel parameters for all of the pixels making up the entire first image frame based on at least environmental lighting conditions.

4. The non-transitory computer readable medium of claim 1,
where the stored instructions in the executable format by the one or more processors are configured to cause further operations as follows,
using a compositor module to collect all of the image pixel data from all of the regions making up the first image frame, and then reassembling image pixel data, from at least the first region and the second region collected on different cycles, for the first image frame based on the identifier correlating to the first image frame.

5. The non-transitory computer readable medium of claim 1,
where the stored instructions in the executable format by the one or more processors are configured to cause further operations as follows,
tracking trends in prior image frames, referencing scene data models, and utilizing one or more artificial intelligence algorithms, to understand what is contextually happening in the first image frame, and then changing the image pixel parameters to increase pixel parameters in the first region while simultaneously maintaining or reducing image pixel parameters in the second region based on i) the contextual understanding of what contextually was happening in the prior image frame and ii) whether salient items are predicted to be located within the first region and not located in the second region, and
analyzing trends in scene data changes with a predictive-and-adaptive-scene-modeling module, and when a lighting condition that is at least one of i) light and ii) dark compared to other portions of an image being captured is trending in the first window region of the first image frame to adjust pixels parameters to compensate for these anticipated dynamic range issues.

6. The non-transitory computer readable medium of claim 1, wherein the sensor control unit supplies pixel parameter feedback to the image processing unit in order to simultaneously and independently vary the image information quality is optimized while staying within 1) any i) bandwidth limitations ii) memory storage, and/or iii) power consumptions limitations, pertaining to one or more image sensors with the pixels capturing the pixel data in regions making up the first image frame, and 2) any i) bandwidth limitations ii) memory storage, and/or iii) power consumptions limitations, pertaining to a communication loop between the sensor control unit and the image sensors.

7. An apparatus, comprising:
one or more image processors, each image processor containing at least its own image sensor with pixels,
a sensor control unit configured to create multiple window regions within a first image frame for the one or more image processors, where each window region capturing that first image frame contains its own set of pixels to capture pixel data, where the image processors are configured to set pixel parameters for pixels in a first window region, in the multiple window regions, to be different in pixel parameters than pixels in a second window region within that first image frame; and thus, the sensor control unit is configured to dynamically adjust the pixel parameters for pixels in the different window regions of interest for the first image frame being captured, and
a predictive-and-adaptive-scene-modeling module that is configured to track trends in one or more previous image frames to assist in understanding what is contextually happening in the first image frame, where the one more image processors are configured to change a mode of operation for each window region; and thus, change pixel parameters for pixels in that window region, based on i) a contextual understanding of what contextually was happening in the one or more previous image frames and ii) whether salient items are located within the first window region or second window region, where pixel parameters for pixels in the first window region are configured to be operating differently than the pixel parameters for pixel data being collected out of the second window region for that same first image frame, where a bi-directional communication loop exists between the predictive-and-adaptive-scene-modeling module and the sensor control unit i) to identify salient items in one or more window regions in a first previous image frame and/or ii) to predict salient items in one or more window regions in a current image frame or a future image frame, and then send guidance to the sensor control unit to change pixel parameters for the set of pixels in the first window region to be different than the set of pixels in the second window region based on the presence or predicted presence of salient items being in the first window region and not in the second window region.

8. The apparatus of claim 7, further comprising:
an image frame mapper to supply and insert a frame identifier, with the pixel data being collected out that set of pixels, for each window region, for the first image frame, where the pixel data coming out of the first window region is collected in a different collection cycle, than the pixel data coming out of the second window region for the first image frame due to the set of pixels in the first window region operating under different pixel parameters than the set of pixels in the second window region capturing a same image frame.

9. The apparatus of claim 8, further comprising:
a compositor module configured to collect all of the image pixel data from all of the regions making up the first image frame, and then the compositor module is configured to reassemble image pixel data, from at least the first region and the second region collected on different cycles, for the first image frame based on the identifier correlating to the first image frame.

10. The apparatus of claim 7, further comprising:
a compositor module is configured to use adaptive settings to determine which region's output will be used as a background base for the first image frame, and which other region's pixel output data will be cropped and pasted into the background base for the first image frame when capturing regions with salient items in that region.

11. The apparatus of claim 7, further comprising:
a compositor module configured to i) accept multiple region's from multiple sensor inputs, and use frame buffers to ii) align pixel data for each region's output spatially, and iii) align pixel data for each region's output temporally, and then iv) to crop and paste the pixel data from one or more selected region's output pixel data onto a background video base for the first image frame.

12. The apparatus of claim 7, where the one or more image processors includes a first image processor that has multiple independent imager sensors, and where the predictive-and-adaptive-scene-modeling module is configured to analyze trends in scene data changes, and when a lighting condition that is at least one of i) light and ii) dark compared to other portions of an image being captured is trending in the first window region of the first image frame to adjust pixels parameters to compensate for these anticipated dynamic range issues.

13. The apparatus of claim 7, where the one or more image processors includes a first image processor that has its own image sensor with pixels and a second image processor that has its own image sensor with pixels, and where these two image processors are configured to cooperate together in a distributed work architecture to capture regions selected from the group consisting of i) different regions per image processor, ii) overlapping regions with one image processor capturing a base video for the first image frame, and iii) combinations of both.

14. An apparatus, comprising:
a sensor control unit to simultaneously and independently control and adjust pixel parameters of i) imager resolution, ii) dynamic range performance and/or iii) frame rate, non-uniformly at regional increments across an entire image captured in a first image frame by pixels in a pixel array,
an image processing unit with a communication loop from the image processing unit to the sensor control unit to supply pixel parameter feedback in order to simultaneously and independently vary i) an imager resolution, ii) a dynamic range and/or iii) a frame rate within different regions of interest in the first image frame within the first image being captured,
a predictive-and-adaptive-scene-modeling module coupled to the sensor control unit to predict salient items in one or more regions of interest in the first image frame and then send guidance to the sensor control unit to i) increase at least one of 1) the imager resolution, 2) the dynamic range and/or 3) the frame rate within those regions with salient items and then either to i) maintain or ii) decrease at least one of 1) the imager resolution, 2) the dynamic range, and/or 3) the frame rate within regions without salient items in order to stay within any i) bandwidth limitations ii) memory storage, and/or iii) power consumptions limitations imposed by 1) one or more image sensors or 2) the communication loop between the sensor control unit and the image processing unit, wherein pixel parameters are configured to set the pixels in the first window region to be different in pixel parameters than pixels in the second window region within that first image frame; and thus, dynamically adjusting the pixel parameters for pixels in the first and second window regions being captured.

15. The apparatus of claim 14, where the predictive-and-adaptive-scene-modeling module and an image-scene-understanding-and-analysis module are configured to cooperate with each other,
where the predictive-and-adaptive-scene-modeling module is configured to analyze and track trends in scene data changes in one or more previous image frames, where one or more scene models are maintained as predictive measures to monitor and track one or more salient items in different scene regions of interest in order to predict needed pixel parameter changes for upcoming image frames, and
where the image-scene-understanding-and-analysis module is configured to analyze a scene in order to identify objects and events occurring in the scene in the previous image frames and identify multiple salient items within regions of the scene, where once the multiple salient items are identified, then that information is passed onto the predictive-and-adaptive-scene-modeling module to ensure the apparatus is ready for rapid changes in the scene that the predictive-and-adaptive-scene-modeling module predicts will change in the scene.

16. The apparatus of claim 14, where the predictive-and-adaptive-scene-modeling module and an image-scene-understanding-and-analysis module are configured to cooperate to i) analyze real-time image scene dynamics, analyze scene activities, and develop semantic reasoning of a scene, while ii) simultaneously determining pixel parameters for the sensor control unit to maximize scene information and send the pixel parameters to the sensor control unit to dynamically adjust the pixel parameters for pixels in the different regions of interest for the first image frame being captured, where the sensor control unit is configured to non-uniformly and independently i) increase at least one of 1) the imager resolution, 2) the dynamic range and/or 3) the frame rate within a first region with a salient item and increase at least a different pixel parameter of 1) the imager resolution, 2) the dynamic range and/or 3) the frame rate within a second region with a salient item based on i) a contextual understanding of what contextually was happening in one or more prior image frames and ii) whether salient items are located within the first region or second region, and where the predictive-and-adaptive-scene-modeling module is configured to analyze trends in scene data changes, and when a lighting condition that is at least one of light and dark compared to other portions of an image being captured is trending in the first window region of the first image frame to adjust pixels parameters to compensate for these anticipated dynamic range issues.

17. The apparatus of claim 14, where the predictive-and-adaptive-scene-modeling module is configured to i) analyze each of the salient items as well as the items of non-saliency found or predicted to be in the prior image frames ii) compare to image and scene data models so that the predictive-and-adaptive-scene-modeling module may identify and predict pixel parameters best suited for that type of salient item.

18. The apparatus of claim 14, where the predictive-and-adaptive-scene-modeling module is configured to include:
 measures to predict upcoming imaging parameter changes through maintaining numerous image data models to support predictive scene understanding and then identify and/or predict salient items and what type of salient items are in one or more regions of interest in the first image frame as well as ii) identify one or more regions without any salient items, and
 then send guidance to the sensor control unit to i) increase at least one of the 1) imager resolution, 2) the dynamic range and/or 3) the frame rate, as best suited to the type of salient items within those regions with salient items as well as then to maintain or decrease at least one of 1) imager resolution, 2) the dynamic range and/or 3) the frame rate within those regions without salient items in order to stay within the i) bandwidth limitations ii) memory storage, and/or iii) power consumptions limitations imposed by 1) the image sensors or 2) the communication loop between the sensor control unit and the image processing unit.

19. The apparatus of claim 14, further comprising:
 a compositor module configured to stitch together items captured in the multiple region of interest within the first image frame using a identifier indicative of the first image frame and included with data being collected from the pixels for each region of interest.

20. The apparatus of claim 14, where the predictive-and-adaptive-scene-modeling module and an image-scene-understanding-and-analysis module are configured to cooperate with each other, where modules cooperate to analyze for the regions of interest in a first image frame that need to be captured optimally with higher imager resolution, dynamic range and/or frame rate within the first image frame because they contain one or more salient items while simultaneously there are other less important regions of interest containing merely non-salient items where reduced image detail can be captured with a default pixel parameter setting for imager resolution, dynamic range and/or frame rate within the first image frame to stay within the 1) i) bandwidth limitations ii) memory storage, and/or iii) power consumptions limitations imposed by one or more image sensors and 2) any i) bandwidth limitations ii) memory storage, and/or iii) power consumptions limitations imposed by a communication loop between the sensor control unit and the image processing unit.

21. The apparatus of claim 14, where the pixel parameters are optimized to be increased or decreased in a first region in the first frame relative to other pixel parameters in a second region in the first frame based on location information of an object in the first frame.

22. The apparatus of claim 14, where the predictive-and-adaptive-scene-modeling module includes one or more machine learning modules and a scene understanding module, which has a scene segmentation and classification module and a region of interest course activity classification module, where the one or more machine learning models include a scene model, an object model, and an event model.

* * * * *